United States Patent
Dar Mousa et al.

(10) Patent No.: US 11,099,107 B2
(45) Date of Patent: Aug. 24, 2021

(54) COMPONENT TESTING PLAN CONSIDERING DISTINGUISHABLE AND UNDISTINGUISHABLE COMPONENTS

(71) Applicant: INTERNATIONAL BUSINESS MACHINES CORPORATION, Armonk, NY (US)

(72) Inventors: Nosaiba Dar Mousa, Wappingers Falls, NY (US); Warren Boldrin, Montgomery, NY (US); Jason Hirst, Poughkeepsie, NY (US); Sreekanth Ramakrishnan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 319 days.

(21) Appl. No.: 16/206,970

(22) Filed: Nov. 30, 2018

(65) Prior Publication Data
US 2020/0173889 A1 Jun. 4, 2020

(51) Int. Cl.
*G01M 99/00* (2011.01)
*G06F 11/36* (2006.01)
(Continued)

(52) U.S. Cl.
CPC .......... *G01M 99/008* (2013.01); *G06F 11/34* (2013.01); *G06F 11/3409* (2013.01);
(Continued)

(58) Field of Classification Search
CPC .............. G01M 99/008; G06F 11/3409; G06F 11/3684; G06F 11/3676; G06Q 10/06315; G05B 2219/37448
See application file for complete search history.

(56) References Cited

U.S. PATENT DOCUMENTS 6,834,375 B1 * 12/2004 Stine .................... H01L 22/20
 257/E21.525
8,418,000 B1 * 4/2013 Salame ................ G06F 11/263
 714/38.1

(Continued)

OTHER PUBLICATIONS

Cao, et al., "A Reinforcement Learning Approach to Production Planning in the Fabrication/Fulfillment Manufacturing Process," Proceedings of the 2003 Winter Simulation Conference (IEE Cat. No. 03CH7499) : 1417-23 vol. 2, pp. 1417-1423. 2003.

*Primary Examiner* — Stephanie E Bloss
(74) *Attorney, Agent, or Firm* — Tihon Poltavets, Esq.; Wayne F. Reinke, Esq.; Heslin Rothenberg Farley & Mesiti P.C.

(57) ABSTRACT

A component testing plan considers both distinguishable components and undistinguishable components for each of the distinguishable components. In addition to distinguishable and undistinguishable components, inputs to the system include a level of customer demand, using component-based demand forecasting, and what test types are to be performed. The system then determines a set of combinatorial test options for each of the test types and a cycle time for each combinatorial test option. The system then cognitively develops a component testing plan including a listing of combinatorial test(s) of the set of combinatorial test options for each test type to be performed and how many times to perform each combinatorial test(s) on a testing machine with a known capacity in order to minimize a total cycle time for all of the test types and a number of the testing machine needed; and implementing the component testing plan on a set of test components on a production line.

20 Claims, 6 Drawing Sheets

(51) Int. Cl.
*G06Q 10/06* (2012.01)
*G06F 11/34* (2006.01)

(52) U.S. Cl.
CPC ...... *G06F 11/3676* (2013.01); *G06F 11/3684* (2013.01); *G06Q 10/06315* (2013.01); *G05B 2219/37448* (2013.01)

(56) References Cited

U.S. PATENT DOCUMENTS

| | | | |
|---|---|---|---|
| 9,672,142 B2 | 6/2017 | Gadzinski et al. | |
| 9,858,175 B1* | 1/2018 | Raghavan | G06F 11/3664 |
| 9,898,396 B2* | 2/2018 | Owen | G06F 11/3664 |
| 10,338,993 B1* | 7/2019 | Lekivetz | G06F 11/0709 |
| 10,754,764 B2* | 8/2020 | Lekivetz | G06F 11/3684 |
| 2002/0099521 A1* | 7/2002 | Yang | G06F 11/3409 |
| | | | 702/186 |
| 2003/0033234 A1* | 2/2003 | RuDusky | G06Q 40/04 |
| | | | 705/37 |
| 2006/0010426 A1* | 1/2006 | Lewis | G06F 11/3684 |
| | | | 717/124 |
| 2011/0145653 A1* | 6/2011 | Broadfoot | G06F 11/3604 |
| | | | 714/38.1 |
| 2013/0117005 A1* | 5/2013 | Farchi | G06F 11/3676 |
| | | | 703/21 |
| 2014/0012560 A1* | 1/2014 | Tzoref-Brill | G06F 11/3676 |
| | | | 703/22 |
| 2014/0031966 A1 | 1/2014 | Cheng et al. | |
| 2014/0297234 A1 | 10/2014 | Garzon et al. | |
| 2016/0210683 A1 | 7/2016 | Aqlan et al. | |
| 2016/0314062 A1* | 10/2016 | Pedro de Castro | G06F 11/3684 |
| 2017/0147722 A1 | 5/2017 | Greenwood | |
| 2017/0193143 A1 | 7/2017 | Saha et al. | |
| 2018/0011464 A1* | 1/2018 | Monczynski | G05B 19/41875 |
| 2019/0361799 A1* | 11/2019 | Wojciak | G06F 11/3684 |
| 2020/0183817 A1* | 6/2020 | Scholz | G06F 11/3684 |

* cited by examiner

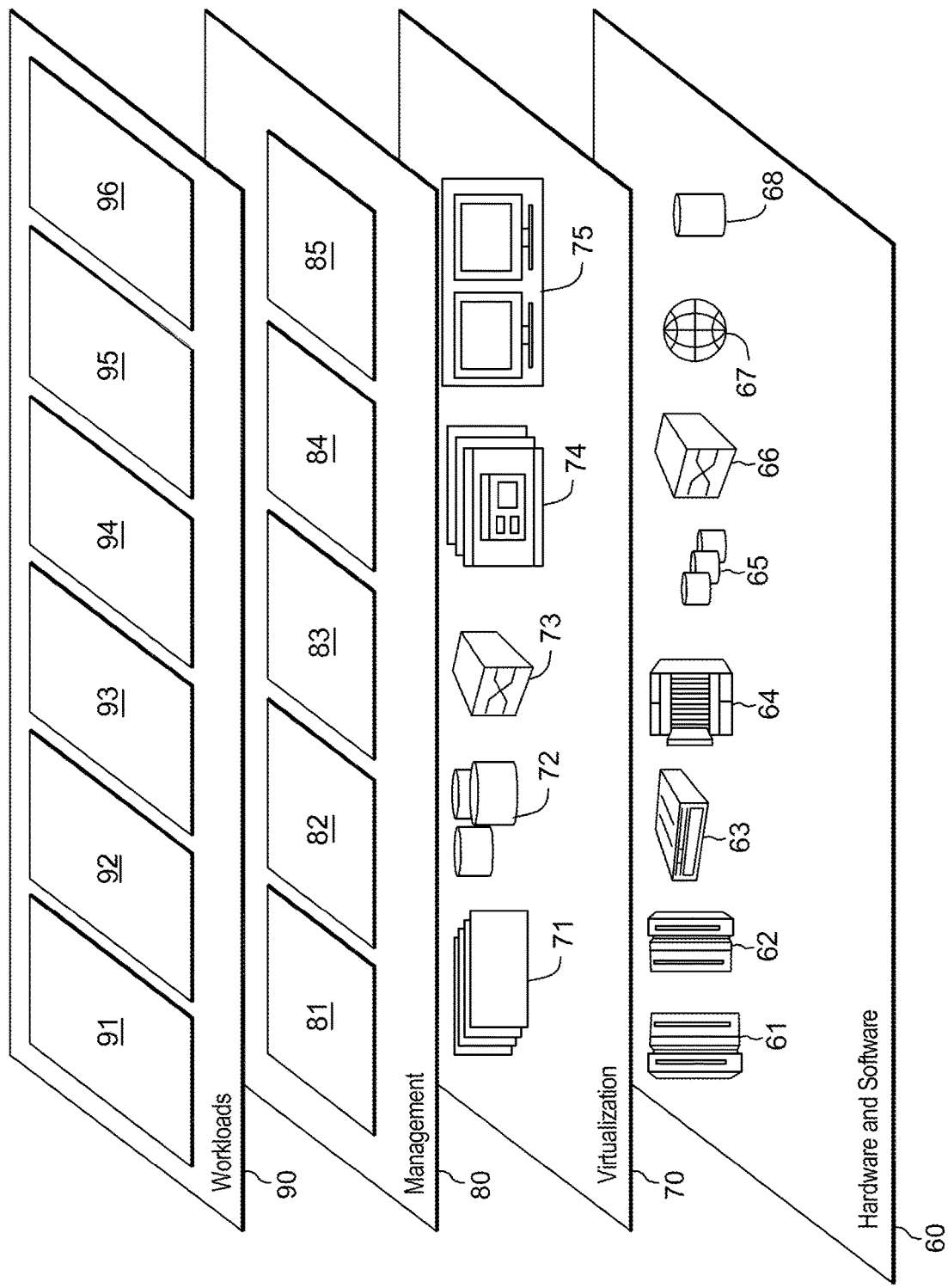

COMPONENT TESTING PLAN CONSIDERING DISTINGUISHABLE AND UNDISTINGUISHABLE COMPONENTS

BACKGROUND

Within manufacturing environments, it is challenging to improve a process in a supply chain without negatively impact the service level of other processes. Unit and integration tests considered as core manufacturing processes in both manufacturing models: integrated and fabrication-fulfillment models. All components and/or commodities have to be tested in order to build finished products using expensive testing machines. To run a test, components/commodities are totally assembled and loaded into testing machines that mimic a finished product. Thus, to test one part, it is essential conventionally to use other tested/untested parts to do a total assembly and load testing machine. Consequently, testing time varies based on the combination of untested parts.

SUMMARY

Shortcomings of the prior art are overcome and additional advantages are provided through the provision, in one aspect, of a computer-implemented method of developing a component testing plan. The method includes: receiving, by a data processing system, an indication of at least two distinguishable components there are for testing, resulting in identified distinguished components; receiving, by the data processing system, an identification of two or more undistinguishable components to be tested for each of the at least two distinguishable components, resulting in identified undistinguished components; receiving, by the data processing system, an identification of a level of customer demand using component-based demand forecasting; receiving, by the data processing system, an identification of a plurality of test types; determining, by the data processing system, a set of combinatorial test options for each of the plurality of test types; determining, by the data processing system, a cycle time for each combinatorial test option of the set of combinatorial test options for each test type, based on the component-based demand forecasting; developing, by the data processing system, a component testing plan, the component testing plan comprising a listing of one or more combinatorial tests of the set of combinatorial test options for each test type to be performed and how many times to perform each of the one or more combinatorial tests on a testing machine with a known capacity in order to minimize a total cycle time for all of the plurality of test types and a number of the testing machine needed; and implementing the component testing plan on a set of test components on a production line.

In another aspect, a system for developing a component testing plan may be provided. The system may include, for example, memory(ies), at least one processor in communication with the memory(ies). Further, the system may include program instructions executable by the one or more processor via the memory to perform a method. The method may include, for example: receiving, by a data processing system, an indication of at least two distinguishable components there are for testing, resulting in identified distinguished components; receiving, by the data processing system, an identification of two or more undistinguishable components to be tested for each of the at least two distinguishable components, resulting in identified undistinguished components; receiving, by the data processing system, an identification of a level of customer demand using component-based demand forecasting; receiving, by the data processing system, an identification of a plurality of test types; determining, by the data processing system, a set of combinatorial test options for each of the plurality of test types; determining, by the data processing system, a cycle time for each combinatorial test option of the set of combinatorial test options for each test type, based on the component-based demand forecasting; developing, by the data processing system, a component testing plan, the component testing plan comprising a listing of one or more combinatorial tests of the set of combinatorial test options for each test type to be performed and how many times to perform each of the one or more combinatorial tests on a testing machine with a known capacity in order to minimize a total cycle time for all of the plurality of test types and a number of the testing machine needed; and implementing the component testing plan on a set of test components on a production line.

In a further aspect, a computer program product may be provided. The computer program product may include a storage medium readable by a processor and storing instructions for performing a method of developing a component testing plan. The method may include, for example" receiving, by a data processing system, an indication of at least two distinguishable components there are for testing, resulting in identified distinguished components; receiving, by the data processing system, an identification of two or more undistinguishable components to be tested for each of the at least two distinguishable components, resulting in identified undistinguished components; receiving, by the data processing system, an identification of a level of customer demand using component-based demand forecasting; receiving, by the data processing system, an identification of a plurality of test types; determining, by the data processing system, a set of combinatorial test options for each of the plurality of test types; determining, by the data processing system, a cycle time for each combinatorial test option of the set of combinatorial test options for each test type, based on the component-based demand forecasting; developing, by the data processing system, a component testing plan, the component testing plan comprising a listing of one or more combinatorial tests of the set of combinatorial test options for each test type to be performed and how many times to perform each of the one or more combinatorial tests on a testing machine with a known capacity in order to minimize a total cycle time for all of the plurality of test types and a number of the testing machine needed; and implementing the component testing plan on a set of test components on a production line.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 6 is a block diagram of one example of functional abstraction layers of the cloud computing environment of FIG. 5, in accordance with one or more aspects of the present disclosure.

DETAILED DESCRIPTION

Figure 1:
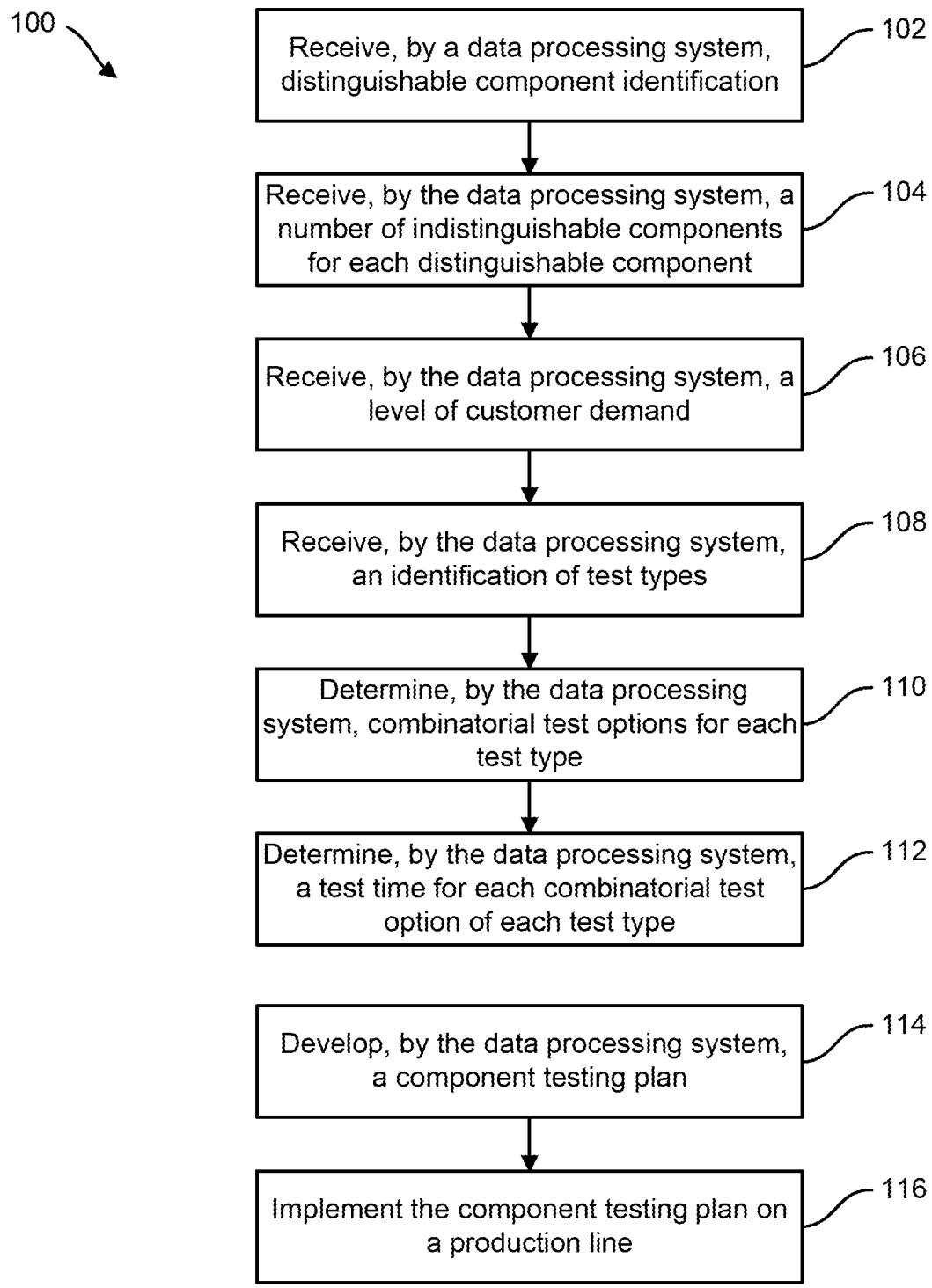
FIG. 1 is a flow diagram for one example of a computer-implemented method of developing and implementing a component testing plan, in accordance with one or more aspects of the present disclosure.

One or more aspects of this disclosure relate, in general, to scheduling resources for component testing. More particularly, one or more aspects of this disclosure relate to considering both distinguishable and undistinguishable components in developing a component testing plan.

Disclosed herein, in accordance with one or more aspects of the present disclosure, a component testing plan is developed that takes into account both distinguishable components and undistinguishable components for each of the distinguishable components. In addition, to distinguishable and undistinguishable components, inputs to the system include a level of customer demand and what test types are to be performed. The system then determines a set of combinatorial test options for each of the test types and a cycle time for each combinatorial test option. The system then cognitively develops a component testing plan including a listing of combinatorial test(s) of the set of combinatorial test options for each test type to be performed and how many times to perform each of the combinatorial test(s) on a testing machine with a known capacity in order to minimize a total cycle time for all of the test types and a number of the testing machine needed; and implementing the component testing plan on a set of test components on a production line.

As used herein, the term "component testing plan" refers to a testing plan for components, parts, commodities, etc. (collectively, "components") designed to minimize total testing time by intelligently choosing, as disclosed herein, combinations of components to be tested together and an optimal (e.g., minimum) number of a testing machine needed for testing the chosen component combinations.

As used herein, the term "distinguishable components" or "distinguished components" refers to components (as defined above with respect to "component testing plan") to be tested that are different from each other (e.g., a memory card and a keyboard), i.e., different component types.

As used herein, the term "undistinguishable components" or "undistinguished components" refers to components (as defined above with respect to "component testing plan") that are of the same type (e.g., 1000 keyboards).

As used herein, the term "real-time" refers to a period of time necessary for data processing and presentation to a user to take place, and which is fast enough that a user does not perceive any significant delay. Thus, "real-time" is from the perspective of the user.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

FIG. 1 is a flow diagram 100 for one example of a computer-implemented method of developing and implementing a component testing plan, in accordance with one or more aspects of the present disclosure. The method includes: receiving 102, by a data processing system, an identification of at least two distinguishable components, resulting in identified distinguished components; receiving 104, by the data processing system, an identification of at least two undistinguishable components to be tested, resulting in identified undistinguished components; receiving 106, by the data processing system, an indication of a level of customer demand; receiving 108, by the data processing system, an identification of a plurality of test types; determining 110, by the data processing system, a set of combinatorial test options for each test type of a plurality of test types; determining 112, by the data processing system, a cycle time for each combinatorial test option of the set of combinatorial test options for each test type; developing 114, by the data processing system, a component testing plan, the component testing plan comprising a listing of one or more combinatorial tests of the set of combinatorial test options for each test type to be performed and how many times to perform each of the one or more combinatorial tests on a testing machine with a known capacity in order to minimize a total cycle time for all of the plurality of test types and minimize a number of the testing machine needed; and implementing 116 the component testing plan on a set of test components on a production line.

Figure 2:
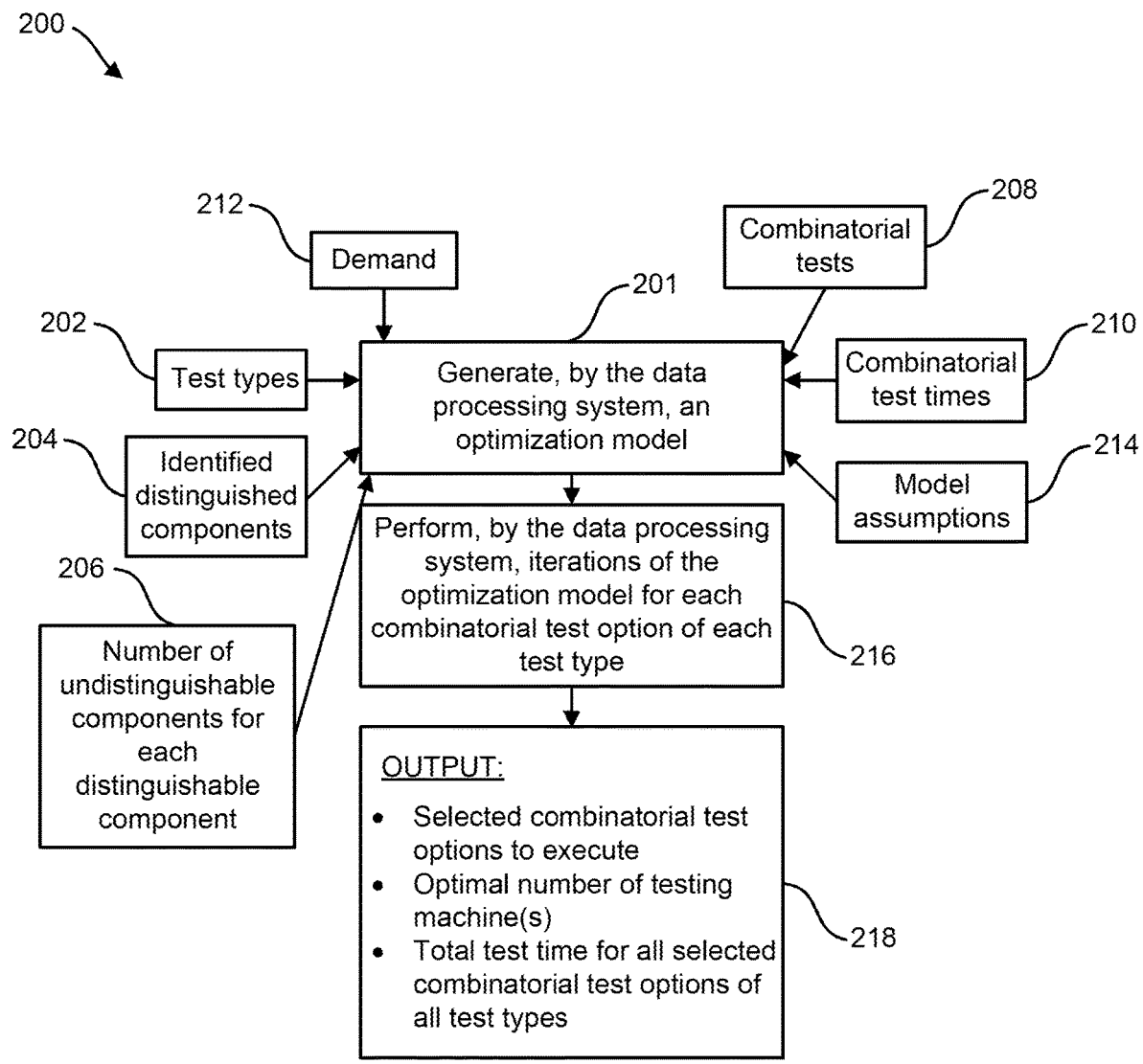
FIG. 2 is a flow diagram for one example of developing, by a data processing system, an optimization model based on test types, identified distinguished components, the number of undistinguished components for each distinguished component, all combinatorial test options, a testing time for each combinatorial test option, customer demand and optimization model assumptions, in accordance with one or more aspects of the present disclosure.

FIG. 2 is a flow diagram 200 for one example of generating 201, by the data processing system, an optimization model based on test types 202, identified distinguished components 204, the number of undistinguished components for each distinguished component 206, all combinatorial test options 208, a testing time for each combinatorial test option 210, customer demand 212 and optimization model assumptions 214, in accordance with one or more aspects of the present disclosure. Once generated, the data processing system performs 216 iterations of the optimization model for each combinatorial test option for each test type. The optimization model is used in choosing, by the data processing system, which combinatorial test options for all test types to use and how many times to perform each, a total cycle time for the chosen tests, as well as an optimal number of testing machine necessary for all chosen combinatorial test options (collectively, "output" 218).

The objective of the optimization model disclosed herein is given as minimizing a total testing time of each combinatorial test option for all test types. One example mathematical model is shown below:

$$\sum_{k=1}^{K}\sum_{i=1}^{c} x_{ki} * t_{ki}$$

where the symbols have meaning in accordance with Table I below:

TABLE I

| Symbol | Description |
| --- | --- |
| i: | number of combination options (index I where i ∈ {1,2, . . . I}) |
| J: | number of distinguishable parts types (index j where i ∈ {1, . . . J}) |

TABLE I-continued

| Symbol | Description |
| --- | --- |
| K: | number of distinguishable test types (index k where k ∈ {1, . . . K}) |
| 0 | binary presentation for each combination option |
| $d_j$: | required quantity of part n to be tested |
| $t_{ik}$: | testing time for option i for testing type k |
| i | combination option |

The model has assumptions and constraints. In one embodiment, the assumptions include: that the components (or commodities) are all available to be used in implementing the component testing plan; that the human resources (those working on the production line) are also all available; and that there is no dependency on emergency supplies of components. The constraints, in one embodiment, include:

$$\sum_{k=1}^{K}\sum_{i=1}^{c} x_{ki} * O_{kij} \geq d_{kij}$$

which ensures that a total number of each of the components to be tested at least meet the constraints noted in Table II:

TABLE II

| | |
| --- | --- |
| a number of each component at least meeting the level of customer demand | $\sum_{k=1}^{K}\sum_{i=1}^{c} x_{ki} * O_{kij} \geq d_{kij}$ |
| each of the plurality of test types have been executed | $\sum_{k=1}^{K}\sum_{i=1}^{c} x_{ki} \geq 1$ |
| at least one of the set of combinatorial test options for each test type has been executed each decision variable for each combinatorial test option for each test type is a zero value or a positive value | $x_{ki} \geq 0$ |
| and each decision variable for each combinatorial test option for each test type that is non-zero is an integer. | $x_{ki}$ is integer |

Figure 3:
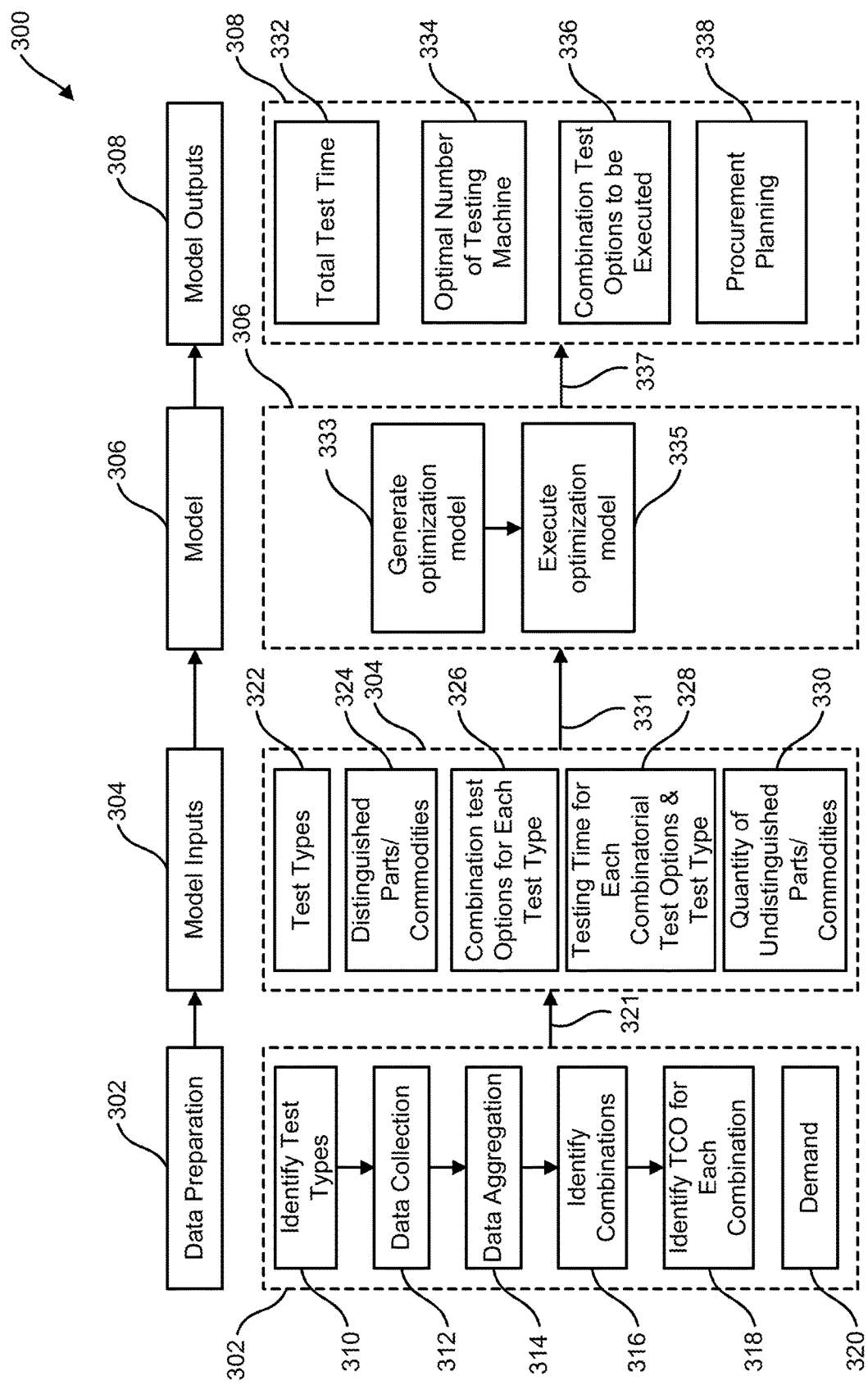
FIG. 3 is a modified flow diagram for a more detailed example of a computer-implemented method of developing and implementing a component testing plan, in accordance with one or more aspects of the present disclosure.

FIG. 3 is a modified flow diagram 300 for a more detailed example of a computer-implemented method of developing and implementing a component testing plan, in accordance with one or more aspects of the present disclosure. At a high level, the method includes preparing 302 data, inputting 304 model inputs, generating 306 an optimization model and outputting 308 the model outputs. Data preparation includes, for example, identifying 310, to a data processing system, the test types to be used. In one example, the test types may include functional testing or environmental testing. The data processing system performs data collection 312, which includes raw data for steps that have been performed. The collected data may then be aggregated 314 by the data processing system to find the average cycle time for each option.

Possible test combinations for each test type are identified 316 by the data processing system. A cycle time for each test combination is identified 318 by the data processing system and an indication of demand for each test type is provided 320 to the data processing system. The demand may be indicated by, for example, a volume of components, here, memory cards, processors, I/O cards, etc.

Using the various data, inputs for the model (see subsequent discussion of the model) are provided 321 to the data processing system. The model inputs include, for example, the test types 322 previously identified. The model inputs further include, for example, distinguishable components or commodities (collectively, "parts") 324. In one example, the distinguishable parts may include, for example, different components of a computer system (e.g., a server). For example, the different computer system components may include memory (e.g., a memory card, solid state drive or random access memory (RAM)), a processor (e.g., a graphics processor subsystem) or one or more peripherals (e.g., a keyboard or a display). The model inputs may further include, for example, a set of combination test options 326 for each test type and a testing time 328 for each combinatorial test option of each test type. The model inputs may further include, for example, a quantity 330 of undistinguishable parts, i.e., how many of each distinguishable component there are (e.g., 1000 of the same type of display).

An optimization model 306, subsequently described in more detail below, is then generated 333 using the model inputs provided 331 and, for example, one or more model assumptions, also described in more detail below. Execution 335 of the optimization model produces 337 the optimization model outputs 308. Outputs of the optimization model may include, for example, a total testing time 332, which includes testing times for all combinatorial test options chosen by the data processing system for all testing types. Another output of the executed optimization model may include, for example, an optimal number 334 of the type of testing machine to be used for all the tests. Using one type of testing machine for all the tests is an assumption of the present example. However, different types of testing machines may instead be used, for example, a different type of testing machine for one or more of the test types. In addition, another example of an optimization model output includes an identification of which combinatorial test options for each test type are to be used 336. Another output of the executed optimization model may include, for example, procurement planning.

Demand forecasting is a field of predictive analytics which tries to understand and predict customer demand to optimize supply decisions by corporate supply chain and business management. Demand forecasting involves quantitative methods such as the use of data, and especially historical sales data, as well as statistical techniques from test markets. Demand forecasting may be used in production planning, inventory management, and at times in assessing future capacity requirements, or in making decisions on whether to enter a new market.

Demand forecasting techniques are divided into survey methods and statistical methods. The survey method is generally for short-term forecasting, whereas statistical methods are used to forecast demand in the long run.

Survey method is one of the most common and direct methods of forecasting demand in the short term. This method encompasses the future purchase plans of consumers and their intentions. In this method, an organization conducts surveys with consumers to determine the demand for their existing products and services and anticipate the future demand accordingly.

Statistical methods are a complex set of methods of demand forecasting. These methods are used to forecast demand in the long term. In this method, demand is forecasted on the basis of historical data and cross-sectional data.

Historical data refers to the past data obtained from various sources, such as previous years' balance sheets and market survey reports. On the other hand, cross-sectional data is collected by conducting interviews with individuals and performing market surveys. Unlike survey methods, statistical methods are cost effective and reliable as the element of subjectivity is minimum in these methods.

Forecast accuracy in the supply chain is typically measured using the Mean Absolute Percent Error or MAPE. Statistically, MAPE is defined as the average of percentage errors.

Most practitioners, however, define and use the MAPE as the Mean Absolute Deviation divided by Average Sales, which is just a volume weighted MAPE, also referred to as the MAD/Mean ratio. This is the same as dividing the sum of the absolute deviations by the total sales of all products. This calculation $$\frac{\sum (|A - F|)}{\sum A}$$

where A is the actual value and F the forecast, is also known as WAPE, Weighted Absolute Percent Error.

Another example, is the weighted $$\frac{\sum (w \cdot |A - F|)}{\sum (w \cdot A)}.$$

The advantage of this measure is that could weight errors, so you can define how to weight for your relevant business, ex gross profit or ABC. The only problem is that for seasonal products you will create an undefined result when sales=0 and that is not symmetrical, that means that you can be much more inaccurate if sales are higher than if they are lower than the forecast. So sMAPE is also used to correct this, it is known as symmetric Mean Absolute Percentage Error.

For intermittent demand patterns none of the above are really useful. So you can consider MASE (Mean Absolute Scaled Error) as a good KPI (Key Performance Indicator) to use in those situations, the problem is that is not as intuitive as the ones mentioned before.

The method herein utilizes an optimization model that considers combination options, distinguishable and undistinguishable parts and execution time for each combination to decide which combinations options to run and how many times each chosen combination option should be run to minimize the total cycle time and the number of the testing machine needed, based on a known capacity. This solution considers process constraints such as customer demand and capacity of the testing machine.

The solution includes an optimization model built as disclosed herein. In another embodiment, the optimization model may be developed using an optimization service, for example, one available over a network (e.g., a global computer network). Such a service may employ, for example, cognitive aspects or predictive analysis. The necessary data is provided to the service, which returns an optimization model that can be used. The main objective of the optimization model is to minimize a total testing time subject to execution time for each test combination. The output is a combination of options that produce a minimum total cycle time for all chosen tests and how many times each combination should be executed. Accordingly, the optimal number of testing machine (a.k.a., WIP driver) can be determined from the known capacity of the testing machine.

Certain embodiments herein may offer various technical computing advantages involving computing advantages to address problems arising in the realm of computer-implemented component testing. Particularly, computer-implemented component testing plans that consider both distinguishable components and undistinguishable components, i.e., how many different distinguishable components are involved and how many units (undistinguishable components) for each distinguishable component. Embodiments herein can include, for example, determining, by a data processing system, a set of combinatorial test options for each test type to be used and a corresponding amount of time each combinatorial test would take to perform. Embodiments herein can include, for example, cognitively developing, by the data processing system, a component testing plan, the component testing plan comprising a listing of one or more combinatorial tests of the set of combinatorial test options for each test type to be performed and how many times to perform each of the one or more combinatorial tests on a testing machine with a known capacity in order to minimize a total cycle time for all of the plurality of test types and a number of the testing machine needed. Embodiments herein can include, for example, the system generating an optimization model designed to minimize overall testing time and using the model iteratively for each test type, yielding a testing time for each test type. Various decision data structures can be used to drive artificial intelligence (AI) decision making. Decision data structures as set forth herein can be updated by machine learning so that accuracy and reliability is iteratively improved over time without resource consuming rules intensive processing. Machine learning processes can be performed for increased accuracy and for reduction of reliance on rule-based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include particular arrangements for both collecting rich data into a data repository and additional particular arrangements for updating such data and for use of that data to drive artificial intelligence decision making.

In one example, a cognitive computer system performs the analysis. In general, the term "cognitive computing" (CC) has been used to refer to new hardware and/or software that mimics the functioning of the human brain and helps to improve human decision-making, which can be further improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI). Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

FIG. 6 is a hybrid flow diagram 600 of one example of an overview of the basic steps for creating and using a natural language classifier service. Initially, training data for machine learning is prepared, 602, by identifying class tables, collecting representative texts and matching the classes to the representative texts. An API (Application Planning Interface) may then be used to create and train the classifier 604 by, for example, using the API to upload training data. Training may begin at this point. After training, queries can be made to the trained natural language classifier, 606. For example, the API may be used to send text to the classifier. The classifier service then returns the matching class, along with other possible matches. The results may then be evaluated and the training data updated, 608, for example, by updating the training data based on the classification results. Another classifier can then be trained using the updated training data.

Various decision data structures can be used to drive artificial intelligence (AI) decision making. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

The system disclosed herein can run various processes including, for example, a Natural Language Understanding (NLU) process, a predicting process and a machine learning process.

The predicting process may employ, for example, a predictive model trained using machine learning to predict, for example, times for combinatorial testing not already known.

In one example, the system may run a machine learning process that can update one or more process run by the system based on obtained data to improve accuracy and/or reliability of the one or more process. For example, all testing times known, including combinatorial testing and non-combinatorial testing, could be used for machine learning. In one embodiment, the system may, for example, employ a decision data structure that predicts, in accordance with the predicting process, one or more possible cycle times.

Further, in another embodiment, the system may run a number of instances of such a decision data structure, each instance for a different unknown combinatorial testing time to be used on a production line. For each instance of the decision data structure, the system can use different variables. The system running such a machine learning process may, for example, continually or periodically update the testing data and/or use different values for variables in the different instances of the decision data structure.

The system may, for example, run a NLU process to process data for preparation of records that are stored in a data repository and for other purposes. The system can run an NLU process for determining one or more NLU output parameter of text. By running an NLU process, the system can perform a number of processes including one or more of (a) topic classification and output of one or more topic NLU output parameter for a received message (b) sentiment classification and output of one or more sentiment NLU output parameter for a received message or (c) other NLP classifications and output of one or more other NLU output parameter for the received message. Topic analysis for topic classification and output of NLU output parameters can include topic segmentation to identify several topics within a message. Topic analysis can apply a variety of technologies e.g. one or more of Hidden Markov model (HMM), artificial chains, passage similarities using word co-occurrence, topic modeling, or clustering.

In a first aspect, disclosed above is a computer-implemented method of developing a component testing plan. The computer-implemented method includes: receiving, by a data processing system, an indication of at least two distinguishable components there are for testing, resulting in identified distinguished components; receiving, by the data processing system, an identification of two or more undistinguishable components to be tested for each of the at least two distinguishable components, resulting in identified undistinguished components; receiving, by the data processing system, an identification of a level of customer demand using component-based demand forecasting; receiving, by the data processing system, an identification of a plurality of test types; determining, by the data processing system, a set of combinatorial test options for each of the plurality of test types; determining, by the data processing system, a cycle time, representing how long a given test is expected to take, for each combinatorial test option of the set of combinatorial test options for each test type; cognitively developing, by the data processing system, a component testing plan, the component testing plan comprising a listing of one or more combinatorial tests of the set of combinatorial test options for each test type to be performed and how many times to perform each of the one or more combinatorial tests on a testing machine with a known capacity in order to minimize a total cycle time for all of the plurality of test types and a number of the testing machine needed; and implementing the component testing plan on a set of test components on a production line.

In one example, the cycle time may include, for example, an average cycle time for each combinatorial test option of the set of combinatorial test options for each test type based on available historical cycle time data. In one example, for each combinatorial test option for which there is no available historical cycle time data, using, for example, a default cycle time.

In one example, the component testing plan in the computer-implemented method of the first aspect may further include, for example, procurement.

In one example, the developing, by the data processing system, the component testing plan in the computer-implemented method of the first aspect may include, for example, performing, by the data processing system, an iteration process for each test type. In one example, the developing, by the data processing system, the component testing plan may further include, for example, generating, by the data processing system, an optimization model based on the test types, the identified distinguished parts, the identified undistinguished parts, the set of combinatorial test options, the cycle time for each combinatorial test of the set of combinatorial test options, the level of customer demand and one or more model assumptions, resulting in a generated optimization model, and wherein the iteration process uses the generated optimization model. In one example, the iteration process produces, for example, a testing time for each test option of each test type.

In one example, the generated optimization model may be, for example, formulated to minimize a total testing time for all of the test types subject to one or more model constraint. In one example, the model constraint(s) may include, for example: a number of each component at least meeting the level of customer demand; each of the test types have been executed; at least one of the set of combinatorial test options for each test type has been executed; each decision variable for each combinatorial test option for each test type is a zero value or a positive value; and each decision variable for each combinatorial test option for each test type that is non-zero is an integer.

In one example, the computer-implemented method of the first aspect may further include, for example, receiving, by the data processing system, a time to run each individual test for each combinatorial test option for each test type for use by the data processing system in the developing.

In a second aspect, disclosed above is a system for developing a component testing plan. The includes: a memory; and at least one processor in communication with the memory to perform a method. The method includes: receiving, by a data processing system, an indication of at least two distinguishable components there are for testing, resulting in identified distinguished components; receiving, by the data processing system, an identification of two or more undistinguishable components to be tested for each of the at least two distinguishable components, resulting in identified undistinguished components; receiving, by the data processing system, an identification of a level of customer demand using component-based demand forecasting; receiving, by the data processing system, an identification of a plurality of test types; determining, by the data processing system, a set of combinatorial test options for each of the plurality of test types; determining, by the data processing system, a cycle time (i.e., how long a given test is expected to take) for each combinatorial test option of the set of combinatorial test options for each test type; cognitively developing, by the data processing system, a component testing plan, the component testing plan comprising a listing of one or more combinatorial tests of the set of combinatorial test options for each test type to be performed and how many times to perform each of the one or more combinatorial tests on a testing machine with a known capacity in order to minimize a total cycle time for all of the plurality of test types and a number of the testing machine needed; and implementing the component testing plan on a set of test components on a production line.

In one example, the cycle time may include, for example, an average cycle time for each combinatorial test option of the set of combinatorial test options for each test type based on available historical cycle time data, and for each combinatorial test option for which there is no available historical cycle time data, using a default cycle time.

In one example, the developing, by the data processing system, the component testing plan in the method of the system of the second aspect may include, for example, performing, by the data processing system, an iteration process for each test type, the developing, by the data processing system, the component testing plan may further include, for example, generating, by the data processing system, an optimization model based on the test types, the identified distinguished parts, the identified undistinguished parts, the set of combinatorial test options, the cycle time for each combinatorial test of the set of combinatorial test options, the level of customer demand and model assumptions(s), resulting in a generated optimization model, and the iteration process uses, for example, the generated optimization model. In one example, the iteration process produces, for example, a testing time for each test option of each test type.

In one example, the generated optimization model may be, for example, formulated to minimize a total testing time for all of the test types subject to model constraint(s), the constraint(s) may include, for example: a number of each component at least meeting the level of customer demand; each of the test types have been executed; at least one of the set of combinatorial test options for each test type has been executed; each decision variable for each combinatorial test option for each test type is a zero value or a positive value; and each decision variable for each combinatorial test option for each test type that is non-zero is an integer.

In a third aspect, disclosed above is a computer program product for developing a component testing plan. The computer program product includes: a storage medium readable by a processor and storing instructions executable by the processor for performing a method of developing a component testing plan. The method includes: receiving, by a data processing system, an indication of at least two distinguishable components there are for testing, resulting in identified distinguished components; receiving, by the data processing system, an identification of two or more undistinguishable components to be tested for each of the at least two distinguishable components, resulting in identified undistinguished components; receiving, by the data processing system, an identification of a level of customer demand using component-based demand forecasting; receiving, by the data processing system, an identification of a plurality of test types; determining, by the data processing system, a set of combinatorial test options for each of the plurality of test types; determining, by the data processing system, a cycle time (i.e., how long a given test is expected to take) for each combinatorial test option of the set of combinatorial test options for each test type; cognitively developing, by the data processing system, a component testing plan, the component testing plan comprising a listing of one or more combinatorial tests of the set of combinatorial test options for each test type to be performed and how many times to perform each of the one or more combinatorial tests on a testing machine with a known capacity in order to minimize a total cycle time for all of the plurality of test types and a number of the testing machine needed; and implementing the component testing plan on a set of test components on a production line.

In one example, the cycle time may include, for example, an average cycle time for each combinatorial test option of the set of combinatorial test options for each test type based on available historical cycle time data, and for each combinatorial test option for which there is no available historical cycle time data, using a default cycle time.

In one example, the developing, by the data processing system, the component testing plan in the method of the computer program product of the third aspect may include, for example, performing, by the data processing system, an iteration process for each test type, the developing, by the data processing system, the component testing plan may further include, for example, generating, by the data processing system, an optimization model based on the test types, the identified distinguished parts, the identified undistinguished parts, the set of combinatorial test options, the cycle time for each combinatorial test of the set of combinatorial test options, the level of customer demand and model assumptions(s), resulting in a generated optimization model, and the iteration process uses, for example, the generated optimization model. In one example, the iteration process produces, for example, a testing time for each test option of each test type.

In one example, the generated optimization model may be, for example, formulated to minimize a total testing time for all of the test types subject to model constraint(s), the constraint(s) may include, for example: a number of each component at least meeting the level of customer demand; each of the test types have been executed; at least one of the set of combinatorial test options for each test type has been executed; each decision variable for each combinatorial test option for each test type is a zero value or a positive value; and each decision variable for each combinatorial test option for each test type that is non-zero is an integer.

Figure 4:
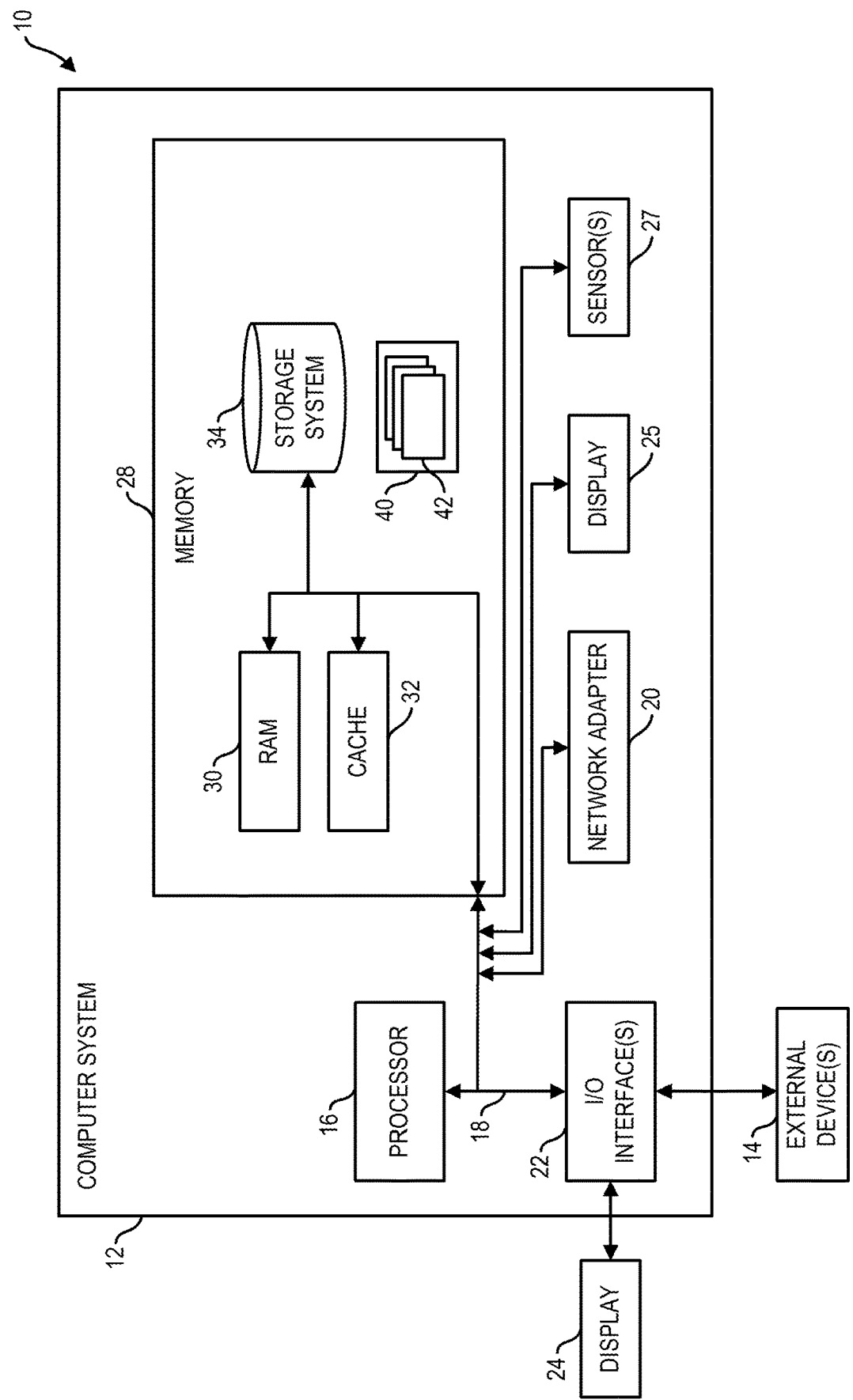
FIG. 4 is a block diagram of one example of a computer system, in accordance with one or more aspects of the present disclosure.
Figure 5:
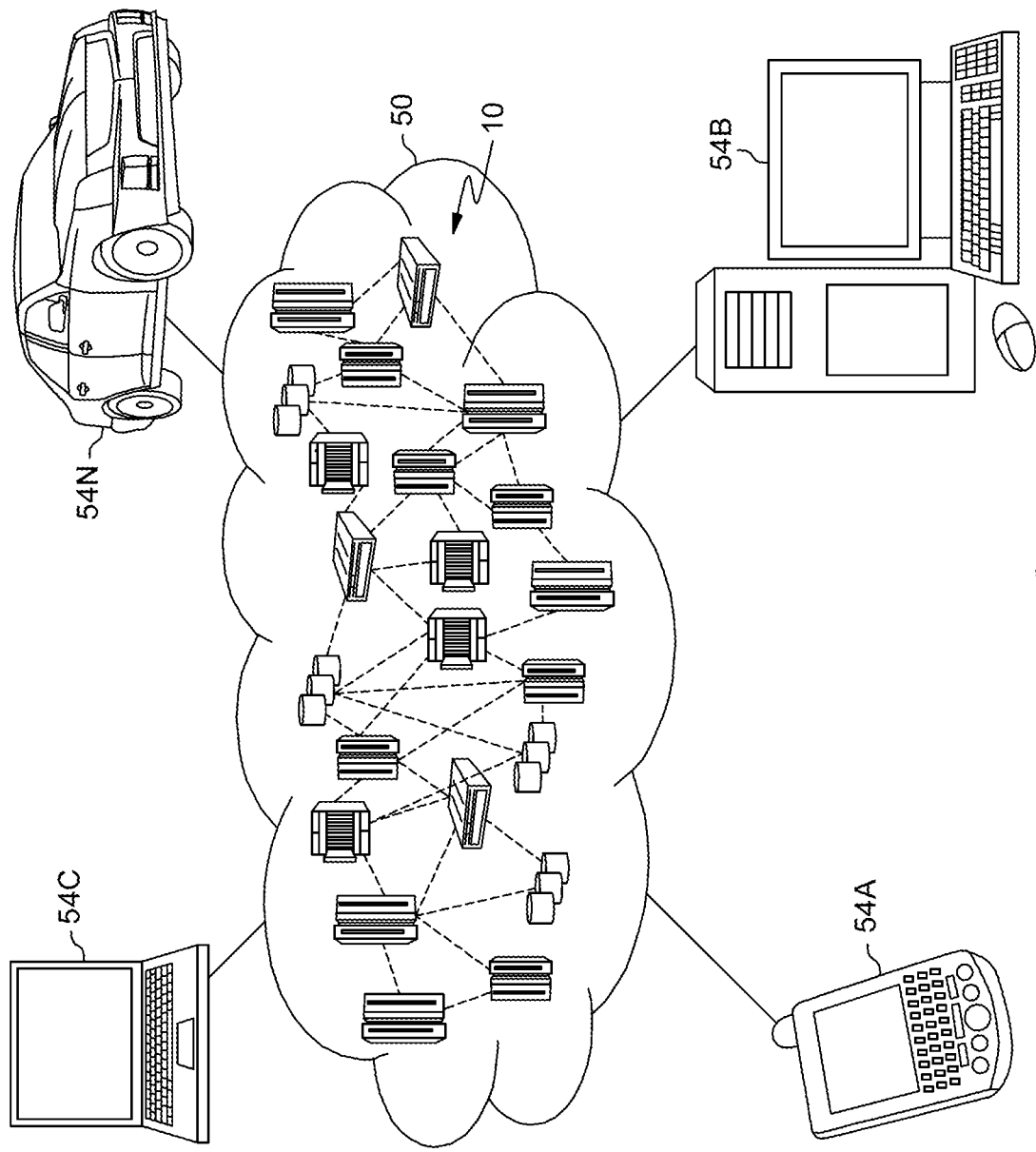
FIG. 5 is a block diagram of one example of a cloud computing environment, in accordance with one or more aspects of the present disclosure.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 5-6.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 5 computing node 10 is described as being implemented in a cloud computing environment and accordingly is referred to as a cloud computing node in the context of FIG. 5.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method of developing a component testing plan, the computer-implemented method comprising:
   receiving, by a data processing system, an indication of at least two distinguishable components there are for testing, resulting in identified distinguished components;
   receiving, by the data processing system, an identification of two or more undistinguishable components to be tested for each of the at least two distinguishable components, resulting in identified undistinguished components, wherein the identified distinguished components and the identified undistinguished components are hardware;
   receiving, by the data processing system, an identification of a level of customer demand using component-based demand forecasting;
   receiving, by the data processing system, an identification of a plurality of test types;
   determining, by the data processing system, a set of combinatorial test options for each of the plurality of test types;
   determining, by the data processing system, a cycle time for each combinatorial test option of the set of combinatorial test options for each test type;
   cognitively developing, by the data processing system, a component testing plan, the component testing plan comprising a listing of one or more combinatorial tests of the set of combinatorial test options for each test type to be performed and how many times to perform each of the one or more combinatorial tests on a testing machine with a known capacity in order to minimize a total cycle time for all of the plurality of test types and a number of the testing machine needed, wherein the component testing plan comprises, for at least one test type of the plurality of test types, a combinatorial test option of the set of combinatorial test options that comprises two or more of the identified distinguished components and, for each of the two or more of the identified distinguished components, at least two of the identified undistinguished components; and
   implementing the component testing plan on a set of test components on a production line.

2. The computer-implemented method of claim 1, wherein the cycle time comprises an average cycle time for each combinatorial test option of the set of combinatorial test options for each test type based on available historical cycle time data.

3. The computer-implemented method of claim 2, wherein for each combinatorial test option for which there is no available historical cycle time data, using a default cycle time.

4. The computer-implemented method of claim 1, wherein the component testing plan further comprises procurement planning.

5. The computer-implemented method of claim 1, wherein the component testing plan comprises an iteration process for each test type.

6. The computer-implemented method of claim 5, wherein the component testing plan further comprises generating an optimization model based on the test types, the identified distinguished components, the identified undistinguished components, the set of combinatorial test options, the cycle time for each combinatorial test of the set of combinatorial test options, the level of customer demand and one or more model assumptions, resulting in a generated optimization model, and wherein the iteration process uses the generated optimization model.

7. The computer-implemented method of claim 6, wherein the iteration process produces a testing time for each test option of each test type.

8. The computer-implemented method of claim 6, wherein the generated optimization model is formulated to minimize a total testing time for all of the plurality of test types subject to one or more model constraint.

9. The computer-implemented method of claim 8, wherein the one or more model constraint comprises: a number of each component at least meeting the level of customer demand; each of the plurality of test types have been executed; at least one of the set of combinatorial test options for each test type has been executed; each decision variable for each combinatorial test option for each test type is a zero value or a positive value; and each decision variable for each combinatorial test option for each test type that is non-zero is an integer.

10. The computer-implemented method of claim 1, further comprising receiving, by the data processing system, a time to run each individual test for each combinatorial test option for each test type for use by the data processing system in the developing.

11. A system for developing a component testing plan, the system comprising:
a memory; and
at least one processor in communication with the memory to perform a method, the method comprising:
receiving, by a data processing system, an indication of at least two distinguishable components there are for testing, resulting in identified distinguished components;
receiving, by the data processing system, an identification of two or more undistinguishable components to be tested for each of the at least two distinguishable components, resulting in identified undistinguished components, wherein the identified distinguished components and the identified undistinguished components are hardware;
receiving, by the data processing system, an identification of a level of customer demand using component-based demand forecasting;
receiving, by the data processing system, an identification of a plurality of test types;
determining, by the data processing system, a set of combinatorial test options for each of the plurality of test types;
determining, by the data processing system, a cycle time for each combinatorial test option of the set of combinatorial test options for each test type using component-based demand forecasting;
cognitively developing, by the data processing system, a component testing plan, the component testing plan comprising a listing of one or more combinatorial tests of the set of combinatorial test options for each test type to be performed and how many times to perform each of the one or more combinatorial tests on a testing machine with a known capacity in order to minimize a total cycle time for all of the plurality of test types and a number of the testing machine needed, wherein the component testing plan comprises, for at least one test type of the plurality of test types, a combinatorial test option of the set of combinatorial test options that comprises two or more of the identified distinguished components and, for each of the two or more of the identified distinguished components, at least two of the identified undistinguished components; and
implementing the component testing plan on a set of test components on a production line.

12. The system of claim 11, wherein the cycle time comprises an average cycle time for each combinatorial test option of the set of combinatorial test options for each test type based on available historical cycle time data, and wherein for each combinatorial test option for which there is no available historical cycle time data, using a default cycle time.

13. The system of claim 11, wherein developing the component testing plan comprises performing an iteration process for each test type, wherein developing the component testing plan further comprises generating an optimization model based on the test types, the identified distinguished components, the identified undistinguished components, the set of combinatorial test options, the cycle time for each combinatorial test of the set of combinatorial test options, the level of customer demand and one or more model assumptions, resulting in a generated optimization model, and wherein the iteration process uses the generated optimization model.

14. The computer-implemented method of claim 13, wherein the iteration process produces a testing time for each test option of each test type.

15. The system of claim 13, wherein the generated optimization model is formulated to minimize a total testing time for all of the plurality of test types subject to one or more model constraint, wherein the one or more model constraint comprises: a number of each component at least meeting the level of customer demand; each of the plurality of test types have been executed; at least one of the set of combinatorial test options for each test type has been executed; each decision variable for each combinatorial test option for each test type is a zero value or a positive value; and each decision variable for each combinatorial test option for each test type that is non-zero is an integer.

16. A computer program product for developing a component testing plan, the computer program product comprising:
a non-transitory storage medium readable by a processor and storing instructions executable by the processor for performing a method of developing a component testing plan, the method comprising:
receiving, by a data processing system, an indication of at least two distinguishable components there are for testing, resulting in identified distinguished components;
receiving, by the data processing system, an identification of two or more undistinguishable components to be tested for each of the at least two distinguishable components, resulting in identified undistinguished components, wherein the identified distinguished components and the identified undistinguished components are hardware;
receiving, by the data processing system, an identification of a level of customer demand using component-based demand forecasting;
receiving, by the data processing system, an identification of a plurality of test types;

determining, by the data processing system, a set of combinatorial test options for each of the plurality of test types;

determining, by the data processing system, a cycle time for each combinatorial test option of the set of combinatorial test options for each test type;

cognitively developing, by the data processing system, a component testing plan, the component testing plan comprising a listing of one or more combinatorial tests of the set of combinatorial test options for each test type to be performed and how many times to perform each of the one or more combinatorial tests on a testing machine with a known capacity in order to minimize a total cycle time for all of the plurality of test types and a number of the testing machine needed, wherein the component testing plan comprises, for at least one test type of the plurality of test types, a combinatorial test option of the set of combinatorial test options that comprises two or more of the identified distinguished components and, for each of the two or more of the identified distinguished components, at least two of the identified undistinguished components; and implementing the component testing plan on a set of test components on a production line.

17. The computer program product of claim 16, wherein the cycle time comprises an average cycle time for each combinatorial test option of the set of combinatorial test options for each test type based on available historical cycle time data, and wherein for each combinatorial test option for which there is no available historical cycle time data, using a default cycle time.

18. The computer program product of claim 16, wherein developing the component testing plan comprises performing an iteration process for each test type, wherein developing the component testing plan further comprises generating an optimization model based on the test types, the identified distinguished components, the identified undistinguished components, the set of combinatorial test options, the cycle time for each combinatorial test of the set of combinatorial test options, the level of customer demand and one or more model assumptions, resulting in a generated optimization model, and wherein the iteration process uses the generated optimization model.

19. The computer program product of claim 18, wherein the iteration process produces a testing time for each test option of each test type.

20. The computer program product of claim 18, wherein the generated optimization model is formulated to minimize a total testing time for all of the plurality of test types subject to one or more model constraint, and wherein the one or more model constraint comprises: a number of each component at least meeting the level of customer demand; each of the plurality of test types have been executed; at least one of the set of combinatorial test options for each test type has been executed; each decision variable for each combinatorial test option for each test type is a zero value or a positive value; and each decision variable for each combinatorial test option for each test type that is non-zero is an integer.

* * * * *